US010373358B2

(12) United States Patent
Young

(10) Patent No.: US 10,373,358 B2
(45) Date of Patent: Aug. 6, 2019

(54) EDGE USER INTERFACE FOR AUGMENTING CAMERA VIEWFINDER WITH INFORMATION

(71) Applicant: Sony Corporation, Tokyo (JP)

(72) Inventor: David Young, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/347,502

(22) Filed: Nov. 9, 2016

(65) Prior Publication Data

US 2018/0131875 A1    May 10, 2018

(51) Int. Cl.
| | |
|---|---|
| G06T 11/60 | (2006.01) |
| G06F 3/0482 | (2013.01) |
| G06F 3/01 | (2006.01) |
| G06F 1/16 | (2006.01) |
| H04N 5/232 | (2006.01) |

(52) U.S. Cl.
CPC ............ *G06T 11/60* (2013.01); *G06F 1/1686* (2013.01); *G06F 3/011* (2013.01); *G06F 3/0482* (2013.01); *H04N 5/232933* (2018.08); *H04N 5/232939* (2018.08); *G06T 2200/24* (2013.01)

(58) Field of Classification Search
CPC ... H04N 5/23293; G06F 3/0482; G06T 11/60; G06T 2200/24
See application file for complete search history.

(56) References Cited

U.S. PATENT DOCUMENTS

| | | | | |
|---|---|---|---|---|
| 6,697,734 B1* | 2/2004 | Suomela | ............... | G01C 21/367 |
| | | | | 340/995.1 |
| 8,896,629 B2* | 11/2014 | Meier | ..................... | G06F 3/011 |
| | | | | 345/632 |
| 9,410,810 B2* | 8/2016 | Lee | ......................... | G01C 21/20 |
| 9,734,634 B1* | 8/2017 | Mott | ..................... | G06T 19/006 |
| 2007/0257993 A1* | 11/2007 | Hara | ................. | G06F 17/30265 |
| | | | | 348/231.2 |
| 2007/0268392 A1* | 11/2007 | Paalasmaa | ............. | G01C 21/20 |
| | | | | 348/333.02 |
| 2009/0169060 A1* | 7/2009 | Faenger | ............... | G09B 29/007 |
| | | | | 382/113 |
| 2009/0281720 A1* | 11/2009 | Jakobson | ........... | G01C 21/3682 |
| | | | | 701/426 |
| 2010/0245630 A1* | 9/2010 | Kurokawa | ............. | H04N 5/232 |
| | | | | 348/240.99 |
| 2011/0141141 A1* | 6/2011 | Kankainen | ......... | H04N 5/23216 |
| | | | | 345/632 |
| 2011/0141305 A1* | 6/2011 | Iwamoto | ................ | H04N 5/232 |
| | | | | 348/222.1 |
| 2011/0164163 A1* | 7/2011 | Bilbrey | .................. | H04N 5/222 |
| | | | | 348/333.01 |

(Continued)

OTHER PUBLICATIONS

Mark Langshaw, "Nokia City Lens Release for Lumia Devices", May 8, 2012, http://www.digitalspy.co.uk/tech/news/a380609/nokia-city-lens-released-for-lumia-devices.html.

*Primary Examiner* — Jason A Flohre
(74) *Attorney, Agent, or Firm* — John L. Rogitz

(57) ABSTRACT

A camera view on a display such as a smart phone display is decimated responsive to a control signal to present augmented reality (AR) information. This creates edges in which the AR information is presented so as not to clutter the camera view, enabling uncluttered use of the standard camera function user interface (UI).

15 Claims, 4 Drawing Sheets

(56) References Cited

U.S. PATENT DOCUMENTS

| | | | |
|---|---|---|---|
| 2011/0273575 A1* | 11/2011 | Lee | G01C 21/20 |
| | | | 348/222.1 |
| 2011/0279445 A1* | 11/2011 | Murphy | G06F 3/04842 |
| | | | 345/419 |
| 2012/0092372 A1* | 4/2012 | Ryu | G06T 19/006 |
| | | | 345/633 |
| 2012/0092373 A1 | 4/2012 | Ryu et al. | |
| 2012/0194547 A1 | 8/2012 | Johnson et al. | |
| 2012/0307091 A1* | 12/2012 | Yumiki | H04N 5/23203 |
| | | | 348/211.4 |
| 2013/0093787 A1* | 4/2013 | Fulks | G06T 11/60 |
| | | | 345/629 |
| 2013/0160138 A1* | 6/2013 | Schultz | G06F 21/6254 |
| | | | 726/27 |
| 2013/0328926 A1* | 12/2013 | Kim | H04N 5/23293 |
| | | | 345/633 |
| 2014/0362111 A1* | 12/2014 | Kim | G06T 19/006 |
| | | | 345/633 |
| 2016/0048287 A1* | 2/2016 | Lee | H04N 5/23293 |
| | | | 715/767 |
| 2016/0073034 A1* | 3/2016 | Mukherjee | H04N 5/23293 |
| | | | 348/333.11 |
| 2016/0125655 A1* | 5/2016 | Tian | G06T 11/00 |
| | | | 345/633 |
| 2017/0140566 A1* | 5/2017 | Ishikawa | G06T 11/60 |
| 2017/0208246 A1* | 7/2017 | Kimura | H04N 5/23206 |

\* cited by examiner

EDGE USER INTERFACE FOR AUGMENTING CAMERA VIEWFINDER WITH INFORMATION

FIELD

The present application relates to technically inventive, non-routine solutions that are necessarily rooted in computer technology and that produce concrete technical improvements.

BACKGROUND

Augmented reality applications typically overlay information in a viewfinder of a camera, which clutters the screen and obscures the camera view. This limits the AR functions to a specific application, and users must use a separate application for enabling basic camera functions.

SUMMARY

With the above in mind, the present 'Edge UI' decimates the viewfinder screen, and utilizes the margins around it to display relevant information regarding the user's surroundings. By pushing augmented information to the sides of the camera view, the camera view is free of clutter, and can be used with a standard camera application with the added benefit of augmented reality information displayed on the sides of the camera view.

Accordingly, a device includes at least one computer memory that is not a transitory signal and that includes executable by at least one processor to receive, from an imager, a camera image. The instructions are further executable to establish a size of the camera image to be a size smaller than a size of a display to render a reduced camera image. The instructions are executable to present the reduced camera image on the display such that at least one margin of the display borders the reduced camera image, and to present, in the margin, an augmented information (AI) user interface (UI). The UI includes at least one selector selectable to present augmented information on the display.

In non-limiting embodiments the instructions are executable to render the reduced camera image by decimating the camera image. The instructions may be executable to, responsive to selection of a selector on the AI UI, present augmented information on the display. If desired, the instructions can be executable to, responsive to selection of a selector on the AI UI, overlay augmented information on the reduced camera image. On the other hand, in some embodiments the instructions can be executable to, responsive to selection of a selector on the AI UI, present augmented information in the margin without overlaying the augmented information on the reduced camera image.

In example embodiments, the instructions are executable to present a camera function UI on the display. The camera function UI may be overlaid on the reduced camera image.

In some implementations, the instructions can be executable to establish the size of the camera image to be the size smaller than the size of a display to render the reduced camera image responsive to a control signal to establish a reduced camera image.

The device can include the processor, the display, and the imager.

In another aspect, a method includes decimating a camera view on a display of a camera device to render at least one margin bordering the camera view. The method also includes presenting a user interface (UI) in the margin with at least one selector selectable to present augmented information (AI) on the display.

In another aspect, an apparatus includes at least one computer storage with executable instructions, at least one processor with access to the storage, at least one imager, and at least one display. The processor is configured to access the instructions for receiving from the imager a camera view, and for reducing the camera view to render a reduced camera view. The processor is configured to access the instructions for presenting the reduced camera view on the display with at least one margin bordering the reduced camera view, and for presenting a user interface (UI) in the margin with at least one selector selectable to present augmented information (AI) on the display.

The details of the present invention, both as to its structure and operation, can be best understood in reference to the accompanying drawings, in which like reference numerals refer to like parts, and in which:

DETAILED DESCRIPTION

Figure 1:
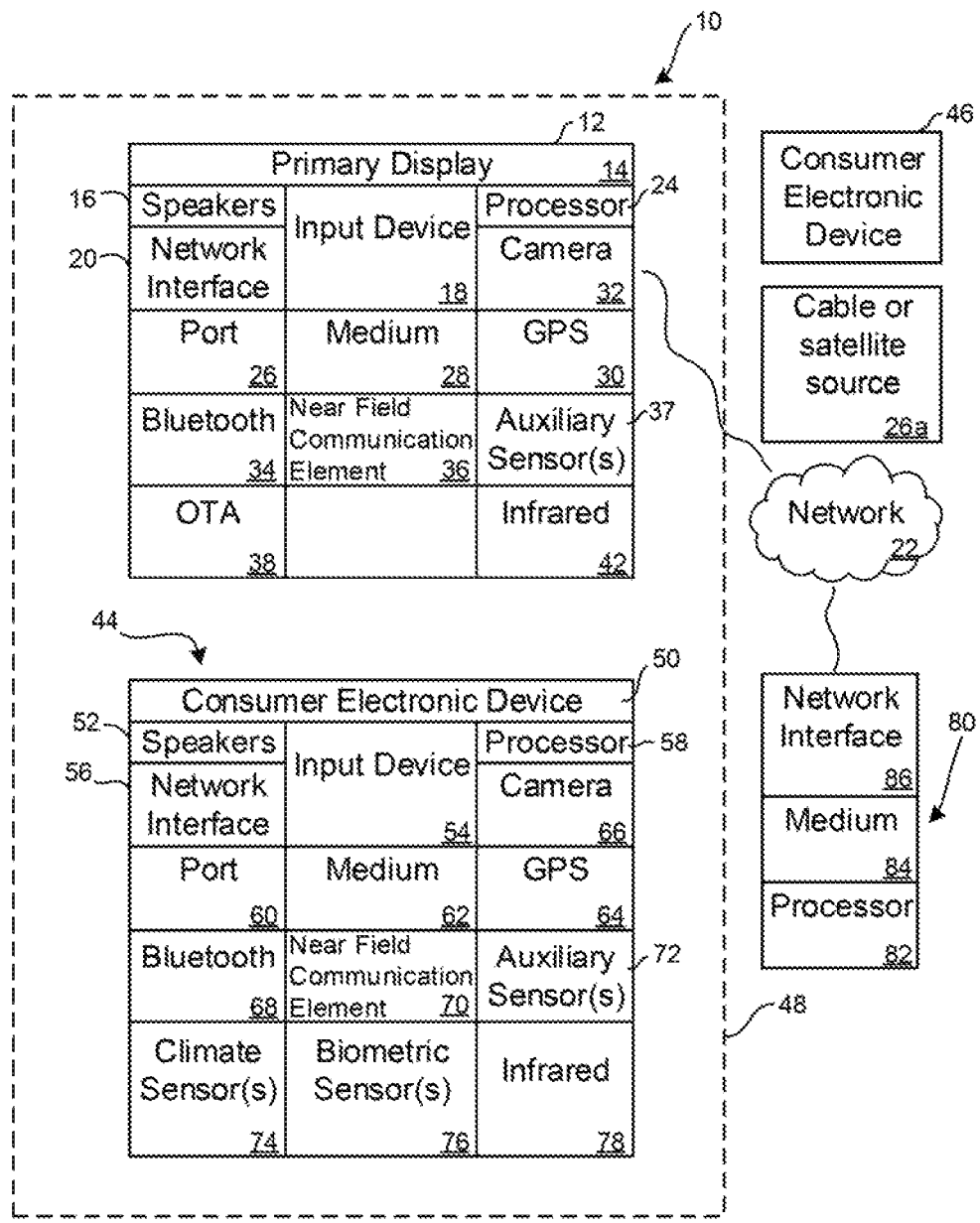
FIG. 1 is a block diagram of an example system including an example in accordance with present principles.

This disclosure relates generally to computer ecosystems including aspects of computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics device (CED) configured as an example primary display device, and in the embodiment shown is a camera device which may be implemented by a smart phone. Or, the CED 12 may be implemented by an Internet-enabled TV with a TV tuner (equivalently, set top box controlling a TV). However, the CED 12 alternatively may be an appliance or household item, e.g. computerized Internet enabled refrigerator, washer, or dryer. The CED 12 alternatively may also be a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the CED 12 is configured to undertake present principles (e.g. communicate with other CE devices to undertake present principles, execute the logic described herein, and perform any other functions and/or operations described herein).

Accordingly, to undertake such principles the CED 12 can be established by some or all of the components shown in FIG. 1. For example, the CED 12 can include one or more displays 14 that may be implemented by a high definition or ultra-high definition "4K" or higher flat screen and that may be touch-enabled for receiving user input signals via touches on the display. The CED 12 may include one or more speakers 16 for outputting audio in accordance with present principles, and at least one additional input device 18 such as e.g. an audio receiver/microphone for e.g. entering audible commands to the CED 12 to control the CED 12. The example CED 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the CED 12 to undertake present principles, including the other elements of the CED 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the CED 12 may also include one or more input ports 26 such as, e.g., a high definition multimedia interface (HDMI) port or a USB port to physically connect (e.g. using a wired connection) to another CE device and/or a headphone port to connect headphones to the CED 12 for presentation of audio from the CED 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The CED 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the CED 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the CED 12 is disposed in conjunction with the processor 24. However, it is to be understood that that another suitable position receiver other than a cellphone receiver, GPS receiver and/or altimeter may be used in accordance with present principles to e.g. determine the location of the CED 12 in e.g. all three dimensions.

Continuing the description of the CED 12, in some embodiments the CED 12 may include one or more imaging devices 32 that may be, e.g., a thermal imaging camera, a digital camera such as a webcam, and/or an imager such as but not limited to a charge coupled device (CCD) or a complementary metal oxide semiconductor (CMOS) imager and controllable by the processor 24 to gather pictures/images and/or video in accordance with present principles. Also included on the CED 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CED 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The CED 12 may include an over-the-air TV broadcast port 38 for receiving OTA TV broadcasts providing input to the processor 24. In addition to the foregoing, it is noted that the CED 12 may also include an infrared (IR) transmitter and/or IR receiver and/or IR transceiver 42 such as an IR data association (IRDA) device. A battery (not shown) may be provided for powering the CED 12.

Still referring to FIG. 1, in addition to the CED 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the CED 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the CED 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
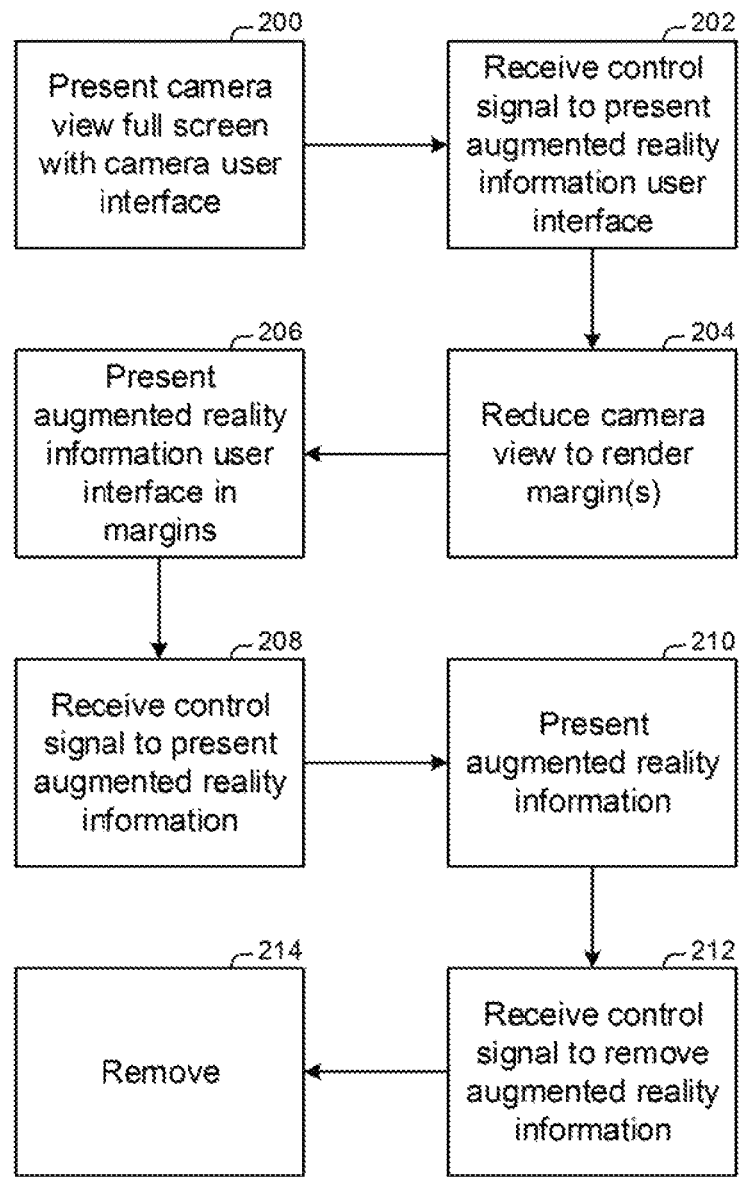
FIG. 2 is a flow chart of example logic.

Now referring to FIG. 2, at block 200 a camera view may be presented full screen on the display of the CED 12. The camera view presents an image from an imaging device such as any of those described above. The image may be a still image or a video image.

Moving to block 202, responsive to a control signal to present an AR information UI, the logic moves to block 204 to reduce the size of the camera view presented on the display. The control signal may be a pre-programmed command or it may be generated responsive to user input on, e.g., a settings menu to provide an option for AR information viewing, or it may be generated by other triggering events.

Reducing the camera view may be done by decimating the camera view. Reduction of the camera view leaves one or more display margins bordering the camera view. Only a single margin may be rendered or up to four margins (top, bottom, left, and right) may be rendered, as shown and described further below.

Moving to block 206, an AR UI is presented in the margins created in block 204. The AR UI may be manipulated at block 208 by a user as further described below to generate a control signal to present AR information on the display, which is presented at block 210. A subsequent control signal may be received at block 212 to remove the AR information, which is duly removed at block 214.

Figure 3:
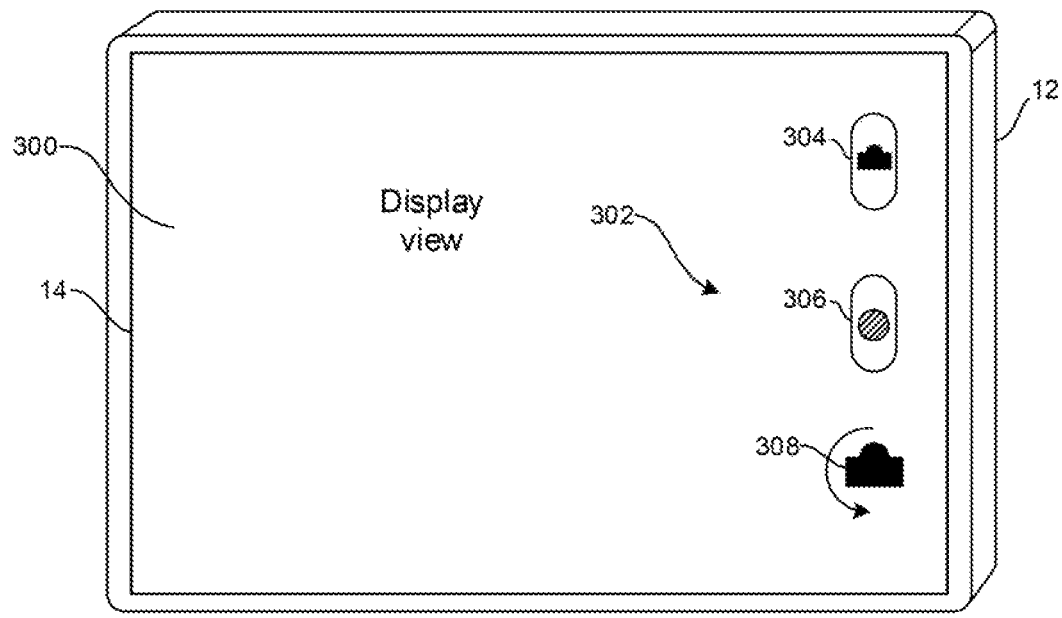
FIG. 3 is a screen shot of the camera view prior to receiving a control signal to present a user interface (UI) for augmented reality (AR) information presentation.

FIG. 3 shows that a camera view 300 is presented full screen on the display 14 of the CE device 12. That is, in the example shown in FIG. 3, the camera view 300 is coterminous with the area of the display 14. A camera function UI 302 may be presented on the display 14, unobtrusively overlaid on the camera view 300. The example camera function UI 302 may include a take picture selector 304, a record video selector 306, and a rotate selector 308.

Figure 4:
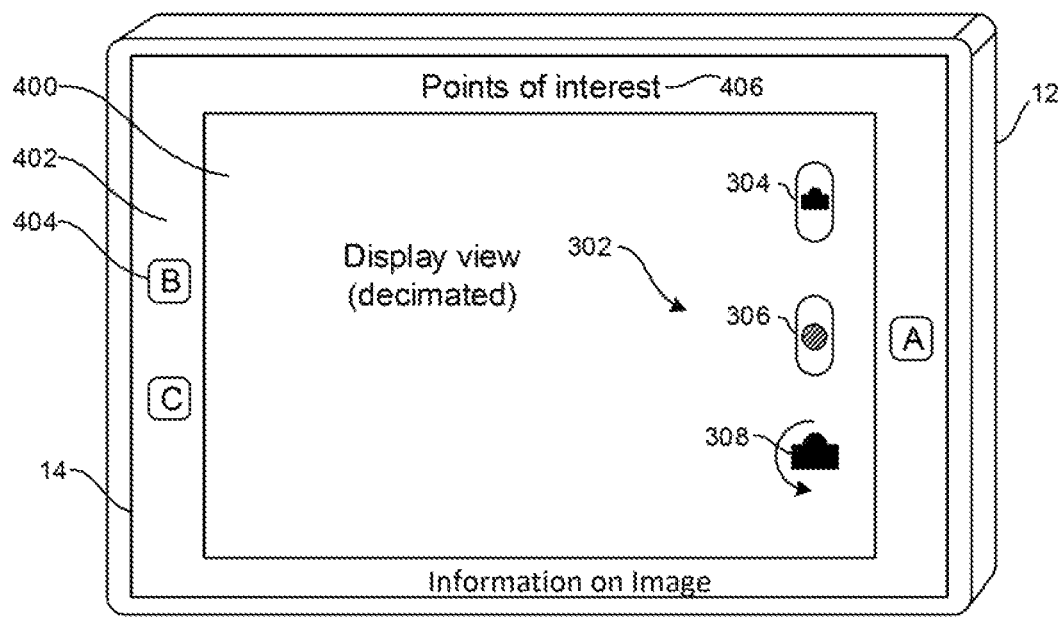
FIG. 4 is a screen shot of the camera view after receiving the control signal to the UI for AR information presentation.

FIG. 4 shows a reduced camera view 400 resulting from the operation at block 204 in FIG. 2. The reduced camera view 400 is not coterminous with the display 14 as shown. Instead, one or more margins 402 (four shown n FIG. 4) are presented on the display 14 bordering the reduced camera view. In the margins 402, various selector elements 404 of an AR UI 406 such as a "points of interest" UI can be arranged as shown. Note that the camera function UI 302 remains visible on the reduced but uncluttered camera view 400 to enable a user to execute camera functions.

Figure 5:
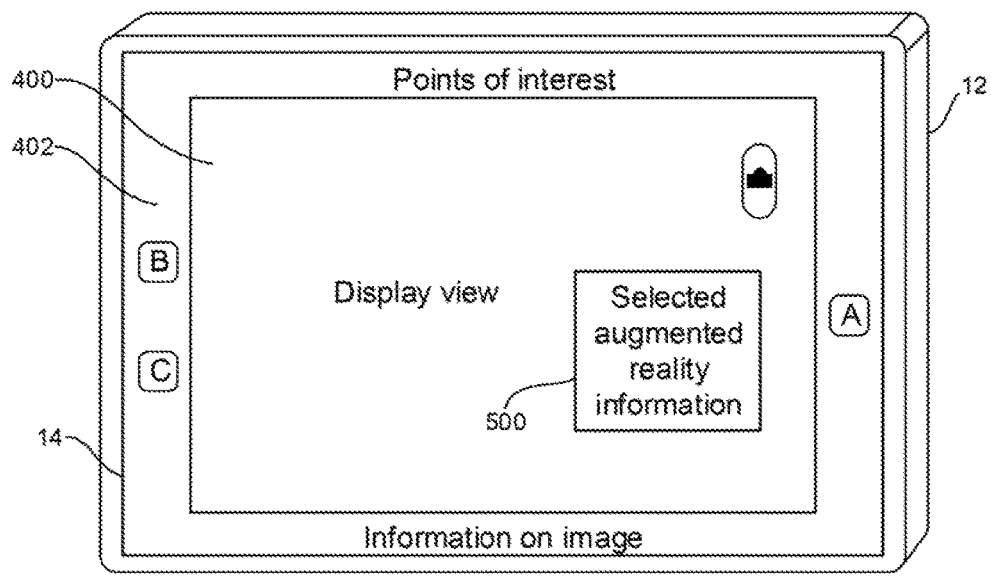
FIG. 5 is a screen shot of the camera view after selection of AR information for display.

Should the user select one of the selectors 404 from the AR UI 406, an AR information window 500 (FIG. 5) may be overlaid onto the reduced camera view 400. Information pertaining to the selected selector from the AR UI is presented in the window 500. While the window 500 may be overlaid on the camera view, it is only responsive to the user's decision to do so and may be removed by, e.g., toggling the selector 404 that instantiated the window 500. Or, the AR information itself may not be overlaid on the reduced camera view 400, but instead may be presented in one or more of the margins 402 along with or in lieu of the AR UI 406.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   receive, from an imager, a camera image;
   present the camera image full screen on a display such that the camera image is coterminous with a size of the display;
   with the camera image presented full screen on the display, overlay onto the camera image a camera function user interface (UI), the camera function UI comprising at least a take picture selector and a record video selector;
   responsive to a control signal generated by user input to present augmented information (AI), establish a size of the camera image to be a size smaller than the size of a display to render a reduced camera image and further present the reduced camera image on the display such that plural margins of the display borders the reduced camera image; and
   present, in the margins, an AI UI comprising at least one selector in each of the plural margins and selectable to present augmented information on the display with the camera function UI remaining visible on the display, wherein selection of a first selector in a first margin causes first augmented information to be presented on the display in lieu of the AI UI and selection of a second selector in a second margin causes second augmented information to be presented on the display.

2. The device of claim 1, wherein the instructions are executable to render the reduced camera image by decimating the camera image.

3. The device of claim 1, wherein the instructions are executable to, responsive to selection of a selector on the AI UI, overlay augmented information on the reduced camera image.

4. The device of claim 1, wherein the instructions are executable to, responsive to selection of a selector on the AI UI, present augmented information in the first or second margin or both the first and second margins without overlaying the augmented information on the reduced camera image.

5. The device of claim 1, wherein the camera function UI is overlaid on the reduced camera image.

6. The device of claim 1, wherein the instructions are executable to establish the size of the camera image to be the size smaller than the size of a display to render the reduced camera image responsive to a control signal to establish a reduced camera image.

7. The device of claim 1, comprising the at least one processor.

8. The device of claim 7, comprising the display.

9. The device of claim 8, comprising the imager.

10. A method, comprising:
presenting a camera image full screen on a display such that the camera image is coterminous with the display area of the display;
with the camera image presented full screen on the display, overlaying onto the camera image a camera function user interface (UI), the camera function UI comprising at least a take picture selector and a record video selector;
responsive to user input to present augmented information (AI), reducing the camera image to render at least first and second margins bordering the camera image;
presenting a UI in at least one of the margins with first and second selectors in the respective first and second margins and selectable to present AI on the display; and
continuing to present the camera function UI on the display along with the selectors selectable to present AI on the display, wherein selection of a first selector in the first margin causes first augmented information to be presented on the display in lieu of the UI and selection of a second selector in the second margin causes second augmented information to be presented on the display.

11. The method of claim 10, wherein the AI is presented on the camera view.

12. The method of claim 10, wherein the AI is presented on at least one of the margins.

13. An apparatus comprising:
at least one computer storage comprising executable instructions;
at least one processor with access to the storage;
at least one imager; and
at least one display, wherein the processor is configured to access the instructions for:
receiving from the imager a camera view;
presenting the camera view full screen on the display such that the camera view is coterminous with the display area of the display;
with the camera view presented full screen on the display, overlaying onto the camera image a camera function user interface (UI), the camera function UI comprising at least a take picture selector and a record video selector;
responsive to a control signal to present augmented information (AI), reducing the camera view to render a reduced camera view;
presenting the reduced camera view on the display with at least first and second margins bordering the reduced camera view;
along with the reduced camera view, presenting a first user interface (UI) in the first and second margins with at least first and second selectors in the respective first and second margins selectable to present augmented information (AI) on the display; and
wherein selection of the first selector in the first margin causes first augmented information to be presented on the display in lieu of the first UI and selection of the second selector in the second margin causes second augmented information to be presented on the display.

14. The apparatus of claim 13, wherein the processor is configured to present the AI on the camera view.

15. The apparatus of claim 13, wherein the processor is configured to present the AI on at least one of the margins.

* * * * *